Patented Nov. 17, 1942

2,302,577

UNITED STATES PATENT OFFICE 2,302,577

POLYMERIZATION OF ROSIN AND ROSIN ESTERS

Alfred L. Rummelsburg, Wilmington, Del., assignor to Hercules Powder Company, Wilmington, Del., a corporation of Delaware No Drawing. Application June 14, 1940,
Serial No. 340,479

23 Claims. (Cl. 260—97)

This invention relates to a method for the polymerization of rosin and rosin esters, and more particularly to such a process wherein the polymerization is brought about by means of a more effective catalyst.

It has previously been proposed to polymerize rosin and rosin esters with various polymerizing agents such as, sulfuric acid, boron trifluoride, phosphoric acid, amphoteric metallic chlorides, and the like. These prior methods of polymerizing rosin and rosin esters are disadvantageous for various reasons. Thus, sulfuric acid as the polymerizing agent causes objectionable charring or discoloration of the material, boron trifluoride as the polymerizing agent is too expensive and otherwise objectionable, phosphoric acid is not sufficiently active, and in general, with prior polymerizing agents, the polymerization does not proceed with the desired effectiveness and smoothness, and is otherwise unsatisfactory.

It is an object of the present invention to devise a process for the polymerization of rosin and rosin esters which overcomes the disadvantages of the prior methods referred to above.

It is another object of the present invention to provide an improved process for polymerizing rosin and rosin esters which is more effective from the standpoint of rapidity of polymerization, and amount of catalyst, and which is capable of easy control and smooth operation.

Another object is to devise a process which is more economical than prior polymerization processes.

Numerous other objects of the present invention will appear more fully hereinafter.

I have discovered that anhydrous hydrofluoric acid is a very effective polymerizing agent for rosin and rosin esters, being active in extremely small amounts, and bringing about polymerization without objectionable tendency toward charring or a large amount of discoloration of the product. Anhydrous hydrofluoric acid is more effective and is considerably less expensive than boron trifluoride. In addition, liquid substantially anhydrous hydrofluoric acid is available commercially and may be very conveniently employed in the polymerization. However, if desired, the hydrofluoric acid may be employed in gaseous form, for example, being generated by the reaction of calcium fluoride with sulfuric acid in known manner, or by heating liquid anhydrous hydrofluoric acid, the gas formed being passed into contact with the rosin or rosin ester to be polymerized, preferably under such conditions that it can in large part be absorbed.

A preferred general procedure in accordance with the present invention involves treating a solution of the rosin or rosin ester to be polymerized in a suitable volatile inert organic solvent with anhydrous hydrofluoric acid in any desired manner, preferably using a reaction vessel which is not appreciably corroded by the catalyst, for a period of time sufficient to bring about the desired polymerization of the raw material. As will appear below, the treatment may be carried out either at normal or at elevated temperature and either at normal or elevated pressure, and the conditions of the treatment are variable within relatively wide limits.

In this specification and in the claims appended hereto, by the term "substantially anhydrous hydrofluoric acid," I mean hydrofluoric acid which is substantially free from water, such as for example, liquid or gaseous hydrofluoric acid which contains no or no more than a trace of dissolved or intermingled water, or hydrofluoric acid containing not more than about 2-3% and preferably not more than about 0.5% by weight of water. Likewise, the present invention contemplates the absence of water in the reaction mixture in amounts greater than these limits, since there is no advantage in using anhydrous hydrofluoric acid if water is present in substantial amounts in the reaction mixture by reason of its inclusion from other sources.

I have found that, although aqueous hydrofluoric acid is a refining agent and a mild polymerization catalyst for rosin and rosin esters, the presence of substantial amounts of water in the hydrofluoric acid substantially inhibits its polymerizing action on rosin or rosin esters. The more anhydrous the hydrofluoric acid, the faster and more effective the polymerization. The effectiveness of hydrofluoric acid as a polymerizing catalyst for rosin or rosin esters rapidly decreases with increasing amounts of moisture in the catalyst or in the mixture. I am not aware of the precise reason why water so markedly reduces catalytic activity of hydrofluoric acid on the polymerization of rosin and rosin esters, but it may be because hydrofluoric acid forms complexes with the double bonds of the rosin or rosin esters, which complexes are decomposed by water, although I do not wish to limit myself to any theory regarding my invention.

The use of anhydrous or substantially anhydrous hydrofluoric acid as the catalyst enables an increase in the melting point of rosin and rosin esters of as much as 10 to 50° C. or more, as determined by the Hercules drop method which is a standard method in the art. This increase in melting point results from the polymerization reaction.

As a solvent for the rosin or rosin ester, there may be employed petroleum ether, hexane, octane, gasoline, V. M. & P. naphtha, saturated cyclic hydrocarbons such as, cyclopentane, cyclohexane, ethyl cyclohexane, para-menthane, tetrahydronaphthalene, decahydronaphthalene, hydrogenated petroleum solvents such as, hydrogenated petroleum naphtha, aromatic solvents such as, benzene, toluene, xylene, etc., halogenated hydrocarbons such as, dichlormethane, chloroform, carbon tetrachloride, ethylene dichloride, tetrachlorethane, dichlorethylene, trichlorethylene, and other volatile organic solvents which are inert with respect to the rosin or rosin ester and with respect to the hydrofluoric acid.

Instead of employing a volatile solvent or diluent which is liquid at ordinary temperature and pressure, under certain circumstances there may be employed a highly volatile solvent or diluent which is gaseous at atmospheric pressures and temperatures, such as for example, propane, n-butane, isobutane, etc. The use of such diluents is facilitated by the employment of elevated pressures sufficient to maintain them in liquid form during the reaction.

The concentration of rosin or rosin ester in the solution thereof may vary within the range of from about 10 to about 75% by weight of the solution. The higher concentrations favor the achievement of the higher melting point in the shorter reaction time, but the use of such high concentrations also favor the development of an increased color in the product. However, the development of such increased color may, in some cases, be greatly counteracted by the employment of gasoline, which has had its olefins removed by means of suitable refining, for example, with 95% $H_2SO_4$, as the solvent for the rosin or rosin ester, since when gasoline is so employed, there is formed during the introduction of the hydrofluoric acid a precipitate or sludge which, when filtered off at the end of the treatment tends to remove color bodies and thus gives a lighter colored product. Instead of gasoline, hexane and other paraffin hydrocarbons may be employed here.

In some cases when aromatic or halogenated solvents are used for the rosin or its ester, a precipitate or sludge forms when the hydrofluoric acid is added to the solution. Removal of this sludge following a suitable reaction period effects a lightening in color of the product obtained from the solution. The formation of sludge is dependent in large part upon the concentration of rosin or its ester in solution. The higher the concentration, the less is the amount of sludge. In many cases when the concentration is above 50%, no sludge forms. If desired, a dark-colored polymerized rosin may be recovered from the separated sludge by treating it with water, thereby decomposing the polymerized rosin- catalyst addition product, followed by extraction with a suitable solvent which is water-immiscible, such as ether, aromatic hydrocarbons, aliphatic hydrocarbons, etc., washing the extract with water and evaporating the solvent. This yields a very high melting point polymerized rosin. Alternatively, the sludge may be directly extracted with a suitable solvent such as ether, etc. and the extract water washed and evaporated to yield a similar product.

The hydrofluoric acid may be employed either in the liquid or in the gaseous form. Where it is employed in liquid form, the commercially available liquid hydrofluoric acid may be introduced into the mixture at the start, the mixture being chilled to below 20° C., the boiling point of anhydrous hydrogen fluoride, and conditions being such throughout the reaction that substantially all of the hydrofluoric acid remains in a non-gaseous state. Some of the liquid hydrofluoric will always be gaseous. If desired, the liquid or gaseous hydrofluoric may be contacted with the rosin or rosin ester solution at temperatures which are substantially higher than the boiling point of liquid hydrofluoric (20° C.). However, under these conditions, a pressure system for the introduction of the hydrofluoric is necessary. The liquid hydrofluoric acid may dissolve in the solvent employed in making up the solution of raw material. Where the anhydrous hydrofluoric acid is employed in gaseous form, it may be bubbled into the agitated solution of rosin or rosin esters in the desired quantity. When employing gaseous hydrofluoric acid at atmospheric pressure, it is preferable to employ a halogenated solvent such as ethylene dichloride or other halogenated solvents enumerated above, because gaseous hydrogen fluoride appears to be somewhat more soluble at atmospheric pressure in halogenated solvents than in hydrocarbon solvents. However, if the reaction is carried out under superatmospheric pressure, the gaseous hydrofluoric acid readily dissolved in any of the solvents enumerated above, and in this way, this difficulty is eliminated. When operating under pressure, employing either liquid or gaseous substantially anhydrous hydrofluoric acid, it is preferred to maintain a pressure such that the major part of hydrofluoric acid is in a non-gaseous form, that is, either in the liquid form by reason of the pressure employed, or in a dissolved form by reason of the employment of this pressure. In some cases where liquid hydrogen fluoride is employed, it may be present in three distinct forms, a portion as liquid hydrofluoric acid in droplet form, emulsified throughout the reaction mixture, a second portion in dissolved form, the gas or liquid being dissolved in the solvent or in the rosin or rosin ester, and a third portion being in the gaseous form either above or intermingled through the reaction mixture by reason of the agitation. Where molten rosin or rosin ester is being treated with liquid or gaseous hydrofluoric acid, it is likewise preferable to maintain a pressure such that a substantial proportion of the hydrofluoric acid is either in liquid form or dissolved in the molten rosin or rosin ester, throughout the treatment.

Thus, instead of employing the rosin or rosin esters in the form of a solution or commingled with an inert diluent, it may be treated when in molten or fluid form.

The temperature of the treatment may vary within relatively wide limits as, for example, from below 0° C. to about 200° C. and preferably from about 0° C. to about 125° C. At temperatures of 0° C. or below, the reaction is comparatively slow. At temperatures much above 125° C., although the reaction is very rapid, it is necessary to be extremely careful to have a short reaction period in order to avoid decomposition of the rosin or rosin esters. The preferred range is from about room temperature (about 20° C.) to about 125° C. At low temperatures, as for example, at temperatures of 20° C. or below, the amount of catalyst, based upon the weight of rosin or rosin ester which gives the maximum increase in melting point, may vary from 5 to about 50% and preferably from about 5 to about 20%. As the temperature is raised, smaller amounts of catalyst are satisfactory. Thus, at temperatures in the neighborhood of 80 to 110° C., the employment of less than 5% of catalyst is feasible, down to, say about ½ or 1%, or even less. However, if the amount of catalyst is reduced to too low a figure, the length of time must be increased in order to obtain the desired degree of polymerization. From the foregoing, it will be apparent that fairly low temperatures and short time of contact are preferable in the polymerization of rosin with anhydrous hydrofluoric acid to prevent excessive decomposition of rosin to rosin oils. If desired, low melting materials, such as rosin oil or unpolymerized rosin can be removed from the polymer by suitably distilling it under reduced pressure and, in this way, the melting point of the product can be materially increased.

The time required for carrying out the treatment depends upon several factors, among which are the concentration of rosin or rosin ester in the solution and in the reaction mixture, the concentration of catalyst, the temperature employed, the extent of polymerization desired, the pressure at which the reaction is conducted, etc. In general, the time may vary from the time required to add the catalyst to 24 hours or more. At elevated temperatures, the reaction period may be considerably shortened for the same degree of polymerization. The same is true of elevated pressures.

The polymerization may be carried out on rosin to obtain polymerized products without reduction in acid number. If desired, however, polymerized products with substantial reduction can be prepared by increasing the amount of catalyst, extending the reaction period, increasing the temperature, or employing a combination of these variants. Reductions in acid number of rosin of as much as 50% are possible. Thus, rosin of an initial acid number of 160 can be polymerized to yield a polymer having an acid number of 100 or as low as 80.

After treatment of the rosin or rosin ester with hydrofluoric acid for the required length of time, the mixture is treated in order to recover the polymer therefrom, as for example, as follows: The catalyst is removed from the mixture by washing the mixture with cold or hot water or, where it is desired to prevent the formation of emulsions, with an aqueous solution of electrolyte such as sodium chloride, sodium sulfate, etc., or a dilute aqueous alkaline solution such as ammonium hydroxide, ammonium carbonate, etc. or a dilute aqueous solution of an organic base such as triethanolamine. While ammonium hydroxide and ammonium carbonate form the ammonium salt of polymerized rosin, this salt may be readily decomposed by heating to regenerate the polymer. Following the washing, the solution of polymer is given a final wash with pure water. Thereafter, the washed solution of polymer is treated to recover the polymer therefrom, as for example, by removing the organic solvent by distillation or evaporation with or without vacuo. Following this treatment, the polymerized product may, if desired, be treated to improve its color, as for example, by contacting a solution thereof in a petroleum solvent with activated clay, activated carbon, fuller's earth, selective solvents, such as furfural, etc. in a manner similar to that by which rosin has been heretofore refined for improvement of color.

The process according to the present invention may be carried out either intermittently or in a continuous manner. The process may be made continuous in several ways, as for example, by continuously introducing a stream of rosin or rosin ester in solution in an organic solvent and hydrofluoric acid either gaseous or liquid to a polymerizing zone, continuously withdrawing reaction mixture, and continuously recovering polymer therefrom in any desired manner, the hydrofluoric acid being recycled continuously.

As suggested above, the process may be carried out either at atmospheric or at elevated pressure. An example of carrying the process out at atmospheric pressure is where gaseous hydrofluoric acid is passed into a solution of rosin or rosin ester in an organic solvent, the solution being maintained at atmospheric pressure. If desired, after the gaseous hydrofluoric acid has been passed into the solution, particularly where it dissolves in the solvent employed at atmospheric pressure, the mixture may be further reacted under elevated pressure for the desired length of time. The employment of pressure is particularly advantageous where liquid hydrofluoric is used since it maintains the hydrofluoric acid either in solution in the solvent employed or in liquid form throughout the polymerization treatment. The pressure utilized may vary within wide limits as, for example, from atmospheric pressure up to 100 atmospheres. As will be obvious when the reaction is conducted at elevated pressures, a suitable vessel such as a suitable bomb or a metal autoclave is utilized.

Preferably, the reaction mixture is continuously agitated throughout the treatment in order to provide intimate contact between the rosin or rosin ester and the anhydrous hydrofluoric acid. This will usually be accomplished by the provision of suitable agitating means. However, where gaseous hydrofluoric acid is bubbled through a solution of rosin or rosin ester or through the molten rosin or rosin ester, this may, in some cases, provide sufficient agitation.

Various types of rosin may be treated according to the process of the present invention, such as wood rosin, gum rosin, isomerized rosin, heat treated rosin, distilled rosin, partially distilled rosin, or any other type of rosin including rosin which has been previously purified or refined or equivalents of rosin, such as abietic acid, pimaric acid, sapinic acid, etc. Likewise, various types of rosin esters may be treated, such as, ester gum, and other polyhydric alcohol esters of rosin, monohydric alcohol esters of rosin, such as ethyl, methyl, propyl, oleyl, stearyl, abietinyl, etc., and aromatic esters, such as phenol, resorcinol, benzyl, and naphthol esters of rosin, etc. Instead of employing a single rosin or rosin ester, mixtures of rosins or rosin esters, or mixtures of rosin and rosin esters may be treated by the present invention.

Preferably, the reaction is carried out in equipment of corrosion-resisting material, such as chrome steel, stainless steel and the like. Copper equipment may be employed, the hydrofluoric acid forming a very insoluble protective film of copper fluoride. It should be noted that when a copper reaction vessel is employed for carrying out the hydrogen fluoride polymerization of rosin in an aromatic solvent, there is a tendency for the rosin to condense with the aromatic solvent if the reaction period is prolonged unduly, say to from 20 to 30 hours.

The reaction may desirably be conducted in an inert atmosphere, such as nitrogen or carbon dioxide, using reagents which are substantially free from air or oxygen and in this way, discoloration is held at a minimum.

Below are given several examples of various methods of carrying out the present invention.

Example 1

Into 400 g. of a 33.3% solution of I wood rosin, (acid number 163, melting point 80° C.) in ethylene dichloride being agitated at a temperature of 26–27° C. there was passed 4 g. of gaseous hydrogen fluoride. The hydrogen fluoride was generated by heating 89 g. of calcium fluoride and 250 g. of 100% $H_2SO_4$, the gaseous hydrofluoric acid thus formed being anhydrous. The reaction mixture turned a deep purple color at first and then gradually turned brown. After standing at room temperature in a closed system for about 24 hours, the reaction mixture was washed thoroughly with cold water and then with hot water, after which the rosin polymer was recovered by evaporation of the solvent. The product had an acid number of 154, a melting point of 92° C. and a color slightly darker than the original. In this example, the percentage of hydrogen fluoride on the weight of rosin was 3.01%.

Example 2

Into 400 g. of a 26.2% solution of I wood rosin (acid number 163, melting point 80° C.) in ethylene dichloride at room temperature (20° C.) there was passed one g. of gaseous hydrofluoric acid. The reaction mixture was then placed in a pressure bottle and heated at 80–90° C. for three hours. The mixture was then cooled and washed with water. The rosin was recovered as in Example 1 and had an acid number of 167, a melting point of 97½° C. and a color of about F. The percentage of hydrogen fluoride on the weight of rosin was 0.95%.

Example 3

To 300 g. of a 50% solution of K wood rosin (acid number 162, melting point 81° C.) in benzene chilled to 0° C. in a chrome steel bomb, there was added 5 g. of commercial liquid anhydrous hydrofluoric acid. The bomb was closed and agitated for four hours at 80 to 100° C., whereupon the bomb was chilled, the solution removed and washed with warm water and the solvent evaporated, giving a product having a color of H. The concentration of hydrogen fluoride on the weight of rosin was 3.33%.

In order to improve the color of the polymer, 400 g. of material prepared as described in the foregoing paragraph was dissolved in 800 g. of benzene whereupon the solution was shaken with 400 g. of 50% sulfuric acid, after which the acid was separated, leaving only the occluded 50% sulfuric acid which was left purposely in order to improve the subsequent zinc-sodium bisulfate bleach. The benzene solution containing the occluded 50% sulfuric acid was refluxed for one hour with agitation with 120 g. of powdered zinc and 200 g. of sodium bisulfate ($NaHSO_4.H_2O$), decanted, washed with water, filtered, and the solvent evaporated to yield a product having the following properties: Acid number 153, melting point 111° C. and color N.

Example 4

A mixture of 35 g. of K wood rosin, 60 g. of isobutane, and 10 g. of anhydrous liquid hydrofluoric acid was agitated at 30° C. for 24 hours in a stainless steel autoclave. The pressure during the treatment was about 30 lbs. per square inch. The autoclave was chilled and the contents removed, diluted with toluene, and washed with water. Upon evaporation of the solution, there was obtained 31 g. of product, having an acid number of 86, a saponification number (drastic method) of 156, a melting point of 116.5, a thiocyanate number of 23, an iodine value of 53, and a color of D.

Example 5

A mixture of 36 g. of K wood rosin, 76 g. of isobutane, and 25 g. of anhydrous liquid hydrogen fluoride was agitated four hours under pressure at 90° C. in a chrome steel pressure autoclave. The product was isolated as in the last example and had an acid number of 86, a melting point of 99° C., a thiocyanate value of 31, an iodine value of 94, and a color of D.

Example 6

To 600 g. of a 33.3% solution of K wood rosin in toluene in a copper flask at 0 to 5° C., there was added 65 g. of anhydrous liquid hydrogen fluoride. The mixture was agitated at atmospheric pressure for four hours at 0 to 5° C. During the treatment, the entrance of moisture was prevented by means of an oil seal about the agitator shaft. The resulting mixture was washed with water and the solvent evaporated, yielding a polymerized rosin having an acid number of 100 and a melting point of 81.5° C. The melting point of the product was obscured by rosin oil which was formed during the treatment. This was demonstrated by the preparation of a similar product in which the reaction time was 20 hours at room temperature (20° C.). This product was vacuum distilled at 1 millimeter pressure to remove the rosin oil. Upon removal of the rosin oil in this manner, there was obtained a product having an acid number of 83 and a melting point of 140° C.

Example 7

A solution of 100 g. ester gum (prepared from gum N rosin) in 200 g. benzene was placed in a stainless steel autoclave and the system chilled to 0° C. Twenty-five g. of liquid hydrofluoric acid was added at about 10° C., with stirring and cooling. The autoclave was then closed and the reaction mixture agitated for a period of seven hours at 80° C. under pressure. The autoclave was then cooled to 0° C., opened, and the reaction mixture water washed. The solvent was evaporated by distillation in vacuo. The product had the following characteristics:

|  | Original | Treated |
| --- | --- | --- |
| Acid number | 8 | 10 |
| Drop melting point | 94 | 125 |
| Color | K | H |
| $(SCN)_2$ value | 92 | 70 |

From the foregoing, it will be seen that the present invention provides a materially improved process for the polymerization of rosin and rosin esters. The substantial elimination of water from the hydrogen fluoride employed as catalyst results in a particularly effective polymerization process. The use of liquid commercially available anhydrous hydrofluoric acid is particularly advantageous because of its active catalytic effect in rosin and rosin ester polymerization, and also its relatively inexpensive nature. In addition, methods have been developed and are known to the art for the convenient handling of liquid or gaseous anhydrous hydrofluoric acid, for example, the use of stainless steel and also copper equipment. Anhydrous hydrofluoric acid is so effective as a catalyst for the polymerization that only small amounts thereof need be employed and the reaction proceeds with very desirable speed. In addition, the use of hydrogen fluoride in anhydrous form is not accompanied by many of the disadvantages which are attendant upon the use of concentrated sulfuric acid as in the prior art.

In the copending application of I. W. Humphrey, Serial No. 340,470, filed of even date herewith, there is described and claimed the polymerization of rosin or rosin esters with aqueous hydrofluoric acid.

In the claims, the term "substantially anhydrous hydrofluoric acid" is intended to denote hydrogen fluoride containing not over 3% by weight of water. In certain of the claims the term "in liquid phase" is intended to refer either to the liquefied gas or to a solution of the gas in a solvent therefor such as the volatile organic solvent or solution present or the molten rosin or rosin ester.

It will be understood that the details and examples hereinbefore set forth are illustrative only, and that the invention as broadly described and claimed is in no way limited thereby.

What I claim and desire to protect by Letters Patent is:

1. The process of polymerizing a material selected from the group consisting of rosin and rosin esters, which comprises treating said material at a temperature of from about 0° C. to about 200° C. with substantially anhydrous hydrofluoric acid for a period of time sufficient to bring about substantial polymerization of said material.

2. The process of polymerizing a material selected from the group consisting of rosin and rosin esters, which comprises treating said material at a temperature of from about 0° C. to about 200° C. with substantially anhydrous hydrofluoric acid under conditions such that the hydrofluoric acid is in liquid form for a period of time sufficient to bring about substantial polymerization of said material.

3. The process of polymerizing a material selected from the group consisting of rosin and rosin esters, which comprises treating said material at a temperature of from about 0° C. to about 200° C. with substantially anhydrous hydrofluoric acid under conditions such that the hydrofluoric acid is in gaseous form for a period of time sufficient to bring about substantial polymerization of said material.

4. The process of polymerizing a material selected from the group consisting of rosin and rosin esters, which comprises treating said material in solution in an inert organic solvent with substantially anhydrous hydrofluoric acid at a temperature of from about 0° C. to about 200° C. for a period of time sufficient to bring about substantial polymerization of said material.

5. The process of polymerizing a material selected from the group consisting of rosin and rosin esters, which comprises treating said material in solution in an inert organic solvent with substantially anhydrous hydrofluoric acid under conditions such that said acid dissolves in said solvent, at a temperature of from about 0° C. to about 200° C. for a period of time sufficient to bring about substantial polymerization of said material.

6. The process of polymerizing a material selected from the group consisting of rosin and rosin esters, which comprises treating said material in solution in a chlorinated hydrocarbon solvent with substantially anhydrous hydrofluoric acid at a temperature of from about 0° C. to about 200° C. for a period of time sufficient to bring about substantial polymerization of said material.

7. The process of polymerizing a material selected from the group consisting of rosin and rosin esters, which comprises treating said material in solution in an inert volatile organic solvent, the concentration of said material in said solution being within the range of from about 10 to about 75% by weight, with substantially anhydrous hydrofluoric acid at a temperature of from about 0° C. to about 200° C. for a period of time sufficient to bring about substantial polymerization of said material.

8. The process of polymerizing a material selected from the group consisting of rosin and rosin esters, which comprises treating said material in solution in an inert volatile organic solvent, the concentration of said material in said solution being within the range of from about 10 to about 75% by weight, with substantially anhydrous hydrofluoric acid in an amount lying within the range of from about 0.5% to about 50% on the weight of said material, at a temperature of about 0° C. to about 200° C. for a period of time sufficient to bring about substantial polymerization of said material.

9. The process of polymerizing a material selected from the group consisting of rosin and rosin esters, which comprises treating said material in solution in an inert volatile organic solvent, the concentration of said material in said solution being within the range of from about 10 to about 75% by weight, with substantially anhydrous hydrofluoric acid in an amount lying withing the range of from about 0.5% to about 20% on the weight of said material, at a temperature of about 0° C. to about 200° C. or a period of time sufficient to bring about substantial polymerization of said material.

10. The process of polymerizing a material selected from the group consisting of rosin and rosin esters, which comprises treating said material in solution in an inert volatile organic solvent the concentration of said material in said solution being within the range of about 10 to about 75% by weight, with substantially anhydrous hydrofluoric acid in an amount lying within the range of from about 0.5% to about 50% on the weight of said material, at a temperature lying within the range of from about 0° C. to about 125° C. for a period of time sufficient to bring about substantial polymerization of said material.

11. The process of polymerizing a material selected from the group consisting of rosin and rosin esters, which comprises treating said material in solution in an inert volatile organic solvent, the concentration of said material in said solution being within the range of from about 10 to about 75% by weight, with substantially anhydrous hydrofluoric acid in an amount lying within the range of from about 0.5% to about 50% on the weight of said material, at a temperature lying within the range of from about 20° C. to about 125° C. for a period of time sufficient to bring about substantial polymerization of said material.

12. The process of polymerizing rosin which comprises treating it with substantially anhydrous hydrofluoric acid at a temperature of from about 0° C. to about 200° C. for a period of time sufficient to bring about substantial polymerization of said rosin.

13. The process of polymerizing rosin which comprises treating a solution thereof in a chlorinated hydrocarbon solvent with gaseous hydrofluoric acid at a temperature of from about 0° C. to about 200° C. for a period of time sufficient to bring about substantial polymerization of said rosin.

14. The process of polymerizing rosin which comprises treating it with substantially anhydrous liquid hydrofluoric acid at a temperature of from about 0° C. to about 200° C. for a period of time sufficient to bring about substantial polymerization of said rosin.

15. The process of polymerizing rosin which comprises treating it with substantially anhydrous hydrofluoric acid at a temperature of from about 0° C. to about 200° C. at an elevated pressure sufficient to maintain a substantial proportion of said acid in liquid phase.

16. The process of polymerizing a material selected from the group consisting of rosin and rosin esters, which comprises treating said material with substantially anhydrous hydrofluoric acid at a temperature of from about 0° C. to about 200° C. for a period of time sufficient to bring about substantial polymerization of said material, washing the mixture to remove hydrofluoric acid therefrom and recovering polymerized material from the washed mixture.

17. The process of polymerizing a material selected from the group consisting of rosin and rosin esters, which comprises treating said material under substantially anhydrous conditions with hydrofluoric acid at a temperature of from about 0° C. to about 200° C. under an elevated pressure sufficient to maintain at least a substantial portion of said acid in liquid phase.

18. The process of polymerizing a material selected from the group consisting of rosin and rosin esters, which comprises treating said material in solution in an inert volatile organic solvent with substantially anhydrous hydrofluoric acid at a temperature of from about 0° C. to about 200° C., separating the sludge which is precipitated when the solution is treated with said acid, and thereafter washing the solution with an aqueous medium to remove residual acid therefrom, and recovering the polymerized material from the washed solution by evaporation of said solvent therefrom.

19. The process of treating a material selected from the group consisting of rosin and rosin esters, which comprises treating said material with substantially anhydrous hydrofluoric acid at a temperature of from about 0° C. to about 200° C. for a sufficient period of time to effect substantial polymerization thereof, washing the reaction product with an aqueous medium, and treating the polymerized material with a refining agent selected from the group consisting of adsorbents and selective solvents to refine the same.

20. The process of continuously polymerizing a material selected from the group consisting of rosin and rosin esters which comprises continuously introducing to a polymerizing zone a solution of said material in an inert volatile organic solvent and substantially anhydrous hydrofluoric acid, maintaining the temperature during polymerization at from about 0° C. to about 200° C. continuously removing reaction mixture from said zone, and treating the reaction mixture to recover the polymerized material therefrom.

21. The process of treating a material selected from the group consisting of rosin and rosin esters, which comprises treating said material at a temperature of from about 0° C. to about 200° C. with substantially anhydrous hydrofluoric acid to effect polymerization of said material, and washing the reaction mixture with an aqueous solution of an electrolyte to remove hydrofluoric acid therefrom.

22. The process of treating a material selected from the group consisting of rosin and rosin esters, which comprises treating said material in solution in an aromatic solvent with substantially anhydrous hydrofluoric acid at a temperature of from about 0° C. to about 200° C.

23. The process of treating a material selected from the group consisting of rosin and rosin esters, which comprises treating said material in solution in benzene with substantially anhydrous hydrofluoric acid at a temperature of from about 0° C. to about 200° C.

ALFRED L. RUMMELSBURG.

CERTIFICATE OF CORRECTION.

Patent No. 2,302,577.　　　　　　　　　　　　　November 17, 1942.

ALFRED L. RUMMELSBURG.

It is hereby certified that error appears in the printed specification of the above numbered patent requiring correction as follows: Page 2, second column, line 32, for "dissolved" read --dissolves--; page 3, first column, line 6, for "110°" read --100°--; page 5, second column, lines 33, 46 and 54, claims 8, 9 and 10, for "of about" read --of from about--; and line 46, claim 9, for "or" read --for--; and that the said Letters Patent should be read with this correction therein that the same may conform to the record of the case in the Patent Office.

Signed and sealed this 5th day of January, A. D. 1943.

Henry Van Arsdale,
(Seal)　　　　　　　　　　　Acting Commissioner of Patents.